Patented July 1, 1941

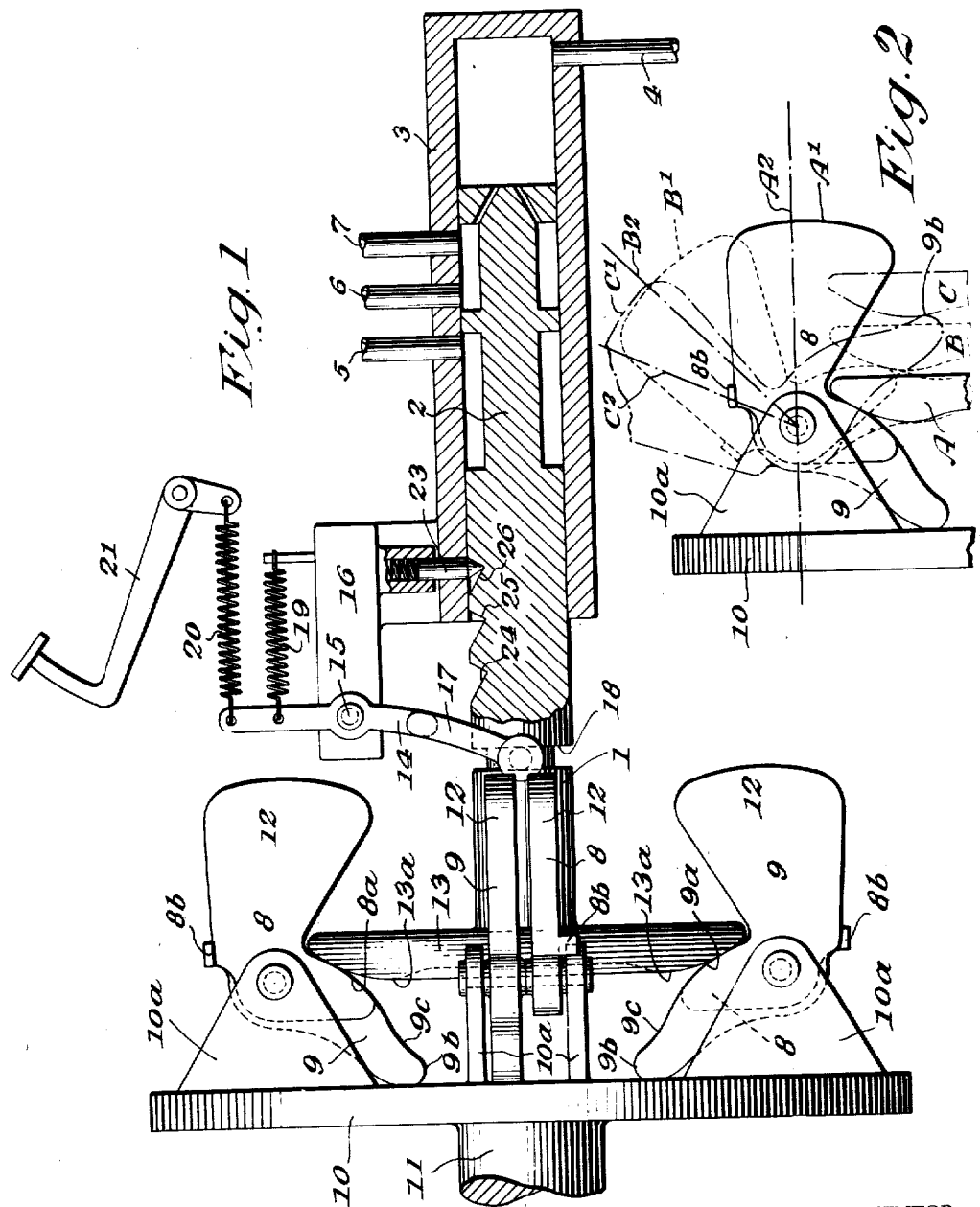

2,247,492

UNITED STATES PATENT OFFICE 2,247,492

SPEED RESPONSIVE MECHANISM

Jesse W. Hale, Newton, Mass.

Application August 20, 1938, Serial No. 225,963

15 Claims. (Cl. 264—3)

My present invention relates to a novel speed responsive mechanism adapted, for example, for use in change speed or like devices, in which the speed responsive mechanism effects movement of a control into at least two predetermined positions.

While speed responsive mechanisms have been widely employed, difficulty has been experienced in causing the desired movements of the control. This difficulty results from the fact that the action of the speed responsive mechanism must be resiliently opposed. With resilient means opposing the governor action, difficulty in securing accurate movements of the control results from the fact that because the speed responsive members vary in effectiveness with the square of the speed, a resilient member adequate to oppose properly the speed responsive mechanism at one predetermined speed becomes inadequate at another predetermined speed.

In accordance with my present concept, I eliminate the above mentioned difficulty by providing a speed responsive mechanism in which the effectiveness of the governor is decreased at higher speeds so that the resultant force is more nearly in direct proportion to speed variations than to the square thereof so that common resilient means may accurately oppose the action of the speed responsive mechanism at all speeds. Accurate movements of the control are thus permitted and if the resistance of the resilient means is under operator control, desired variations in the action of the speed responsive means may be readily effected regardless of the speed.

I accomplish this result in the preferred embodiment of my invention by the use of separate governors opposed by a common resilient control. Assuming that only two movements of the control are desired, two governors are employed and they initially act together with a predetermined force. At a predetermined speed, however, one of the governors is rendered inoperative while the other governor remains effective but with lesser force so that the resilient control remains capable of providing proper opposition.

In the accompanying drawing I have shown an embodiment of my invention from which its general features and advantages will be readily apparent. In the drawing:

Fig. 1 shows an embodiment of my invention, and

Fig. 2 is a view showing the action of the governor.

In the drawing I have shown at 1 a control actuating member. While the control may be of any type or construction depending on the particular use of my invention, I have shown the control as comprising a valve 2 carried by the member 1 and slidable within a casing 3 having a conduit 4 to return fluid to its source. The valve 2 is adapted to connect the inlet 5 to the outlet 6 on a predetermined movement of the member 1 and to also connect the port 7 to the outlet 6 on a predetermined further movement of the member 1. For purposes of convenience, it may be assumed that my invention is employed to control the change of ratios in a change speed device and that one ratio is established by fluid delivered through the port 6 and another ratio is established by fluid delivered through the port 7. It will be appreciated that my device may likewise be used with an electrical or mechanical control and may readily be adapted to cause as many predetermined movements of the control as are desired.

Movement of the member 1 is effected by my novel governor or speed responsive means which comprise the plurality of weighted lever members 8 and the plurality of weighted lever members 9 pivotally mounted in the ears 10a of the head 10 of the driving member 11 adapted to be operatively connected to any suitable means to a rotating shaft (not shown). The levers 8 and 9 are weighted as at 12 and are disposed to contact the flange 13 of the member 1 and to cause movement of the member 1 by centrifugal force. The members 8 and 9 may be levers as shown and they may be formed integrally with the weights 12. The weighted levers 8 carry stops 8b adapted to contact one of the ears 10a to which the weighted levers 8 and 9 are pivotally connected. Thus the weighted levers 8 become ineffective at a certain speed as will be later set forth.

The centrifugal force of the speed responsive means is opposed by suitable resilient means. In the embodiment of my invention shown in the drawing, a lever 14 is pivoted as at 15 to any suitable support indicated as at 16. The lever 14 engages the member 1 in any desired way such as the engagement of the forked end 17 with the groove 18 on the member 1. The lever 14 is under the control of a tension spring 19 anchored to the support 16 and of a second tension spring 20 anchored to the end of a lever 21 which may be manually adjusted to vary the tension of the spring 20 and accordingly vary the opposition to the speed responsive means. As suggested in the drawing, the lever 21 may constitute the accelerator or the like for the prime mover so that the speed responsive means is opposed in proportion to the torque demands. That is, if the accelerator is sharply depressed, under which condition the torque would normally be greatest, the speed responsive means are opposed to the greatest possible extent.

Because the resilient means employed to oppose the action of the speed responsive means must afford effective opposition at speeds of the driving member 11 which may be contrasted with respect to the centrifugal force exerted by the weighted levers 8 and 9, it is essential that the effectiveness of the speed responsive means be decreased as the speed of the driving member increases.

In accordance with my invention, the levers 8 and 9 are formed with identical cam portions 8a and 9a and the levers 9 are longer than the levers 8 and include the cam portions 9b. The cam portions 9a and 9b are separated by a recessed portion 9c. The flange 13 of control member 1 is formed with a cam surface 13a.

In operation, the initial position of the flange 13 is indicated at A in Fig. 2 and the position of the weighted members 9 is indicated at A'. As the cam portions 8a and 9a are identical, the weighted members 8 are shown in Fig. 2 only where the cam portions 8a and 9a are operative. It may be assumed, however, that there is a pair of weighted members 8 and a pair of weighted members 9 and that the movement of the member 1 to the position wherein the inlet port 5 and the outlet port 6 are connected takes place at a speed of the driving member 12 representing 6 M. P. H. The position of the flange 13 where the inlet port 5 and the outlet port 6 are connected is indicated at B.

After movement of the member 1 from the position A to the position B, the weighted members 8 are rendered inoperative by contact of the stop portions 8b with the ears 10a. The position of the weighted members 9 is indicated at B'. The weights have moved through an arc of approximately 45° defined by the lines A² B².

When the weighted members 9 are in the position B', the weighted members 8, as stated, are inoperative. The recessed portions 9c of the members 9 are in contact with the cam surface 13a of the flange 13. Further movement of the member 1 is delayed until the speed of the weighted members 9 is sufficiently increased to take care of the leverage change and the loss of weight.

During movement of the member 1 to a position wherein the inlet 5 and the outlet port 7 are connected which may be assumed to take place at 12 M. P. H. and which is represented by the position C of the member 13 and the position C' of the weighted members 9 in Fig. 2, the weights 12 have moved through an arc of approximately 20° as defined by the lines B² and C² while the movement from B to C is equal to the movement A to B. In movement of the weights through the arc B² C², centrifugal effect exerted on the fulcrum is increased.

It will thus be appreciated that I have modified the action of the speed responsive mechanism by reducing the weight factor and by varying the leverage with which the remaining weight elements engage with the member 13. This permits a substantial variation in speed of the member 11 without unduly increasing resistance to movement of the accelerator or other control 21.

The resilient means employed to oppose the action of the speed responsive means then remains capable of adequately opposing the action of the speed responsive means during all movements and is effective to dominate the action of the speed responsive means at any speed of the driving member 11.

At 23 I have shown a spring controlled member adapted to engage the notches 24, 25 and 26 in the member 1. While the member 23 and the notches act as detents during movement of the member 1 during increases of speed of the driving member 11, their most important function is to retain the control in its advanced position, i. e. until the speed of the driving member 11 has decreased below that normally effective to permit the resilient means to move the member 1 in a direction opposite to that caused by the speed responsive means. If desired, the notches 24, 25 and 26 may establish a minimum detent action during increases in speed of the driving member 11 and the maximum detent action during decreases in speed of the driving member 11. This result may be accomplished by varying the angularity of the sides of the inlets.

It will be understood that my invention may be used wherever at least two predetermined movements of a control by speed responsive means is desired and it will be appreciated that in accordance with my invention, these movements may be accurately controlled by the use of resilient means adequate to oppose properly the speed responsive means in effecting those movements.

What I therefore claim and desire to secure by Letters Patent is:

1. In a speed responsive mechanism to effect two predetermined movements of a control, a control actuating member having a cam surface, a driving member and means carried by said member to actuate said control actuating member, said means including first and second governors centrifugally operated by said driving member, each of said governors including a plurality of weighted members, means resiliently opposing the action of both of said governors, the weighted members of said first governor including first and second cam portions and a recessed portion intermediate said cam portions, the weighted members of said second governor including a cam portion identical to said first cam portion of said first governor, said identical cam portions of said first and second governors being in contact with said control actuating member cam surface until a predetermined speed of said driving member is attained, means to render said second governor inoperative at said predetermined speed and said second portion of said first governor being in contact with said control actuating member at said predetermined speed whereby a further increase in speed of said driving member is required to render said weighted member of said first governor effective to cause movement of said control actuating member by said second cam surfaces.

2. In a speed responsive mechanism, a movable control member, a rotatable driving member, a governor carried by said driving member adapted to cause movements of said control in substantially direct relation to the speed of rotation of said driving member, said driving member comprising sets of weighted members including control contacting lever portions, means to decrease the effectiveness of said governor as the speed of rotation of said driving means increases, said means comprising means to render the lever portions of one set of members ineffective, means to alter the effective leverage of the remaining lever portions, and tension means to oppose the action of said governor.

3. In a speed responsive mechanism, a movable control member, a rotatable driving member, a governor carried by said driving member adapted to cause movements of said control in substantially direct relation to the speed of rotation of said driving member, said driving member comprising sets of weighted members including control contacting lever portions, means to decrease the effectiveness of said governor as the speed of rotation of said driving means increases, said means comprising means to render the lever portions of one set of members ineffective, means to alter the effective leverage of the remaining lever portions, tension means to oppose the action of said governor, and an operator control to instantly vary the opposition of said tension means to the action of said governor.

4. In a speed responsive mechanism to effect two predetermined movements of a control, a control actuating member, a driving member, and centrifugally operated members carried by said driving member, said centrifugally operated members including portions to contact said control actuating member at different predetermined speeds, said portions including a pair of spaced cam portions, one of said cam portions being effective at one of said predetermined speeds to give a greater leverage effect in effecting one of said predetermined movements and the other portion being effective at another predetermined speed to give a lesser leverage effect, said spaced cam portions being disposed so that at the completion of the movement of said control member by the first named cam portion, the second named cam portion becomes effective with a substantially decreased leverage effect.

5. In a speed responsive mechanism to effect two predetermined movements of a control, a control actuating member, a driving member, and centrifugally operated members carried by said driving member, said centrifugally operated members including portions to contact said control actuating member at different predetermined speeds, said portions including a pair of spaced cam portions, one of said cam portions being effective at one of said predetermined speeds to give a greater leverage effect in effecting one of said predetermined movements and the other portion being effective at another predetermined speed to give a lesser leverage effect, said spaced cam portions being disposed so that at the completion of the movement of said control member by said first named cam portion, said second named cam portion becomes effective with a substantially decreased leverage effect, tension means to oppose said movement, and an operator control to instantly vary the opposition of said tension means to the action of said centrifugally operated members.

6. In a speed responsive mechanism to effect two predetermined movements of a control, a control actuating member, a driving member, and centrifugally operated members carried by said driving member including lever portions to contact said control actuating member at different predetermined speeds, said levers including a pair of spaced cam-shaped contact portions, one of said cam portions being effective at one of said predetermined speeds to give a greater leverage effect in effecting one of said predetermined movements and the other portion being effective at another predetermined speed to give a lesser leverage effect, said leverage effects being effective to move said control actuating member, tension means to oppose said movement, and said control actuating member being formed with spaced cam surfaces for each of said lever portions.

7. In a speed responsive mechanism to effect two predetermined movements of a control member, a driving member, a governor carried by said driving member, said governor comprising a plurality of sets of centrifugally operated members including lever portions of different leverages to actuate said control member to effect a greater leverage effect at low speeds and a lesser leverage effect at higher speeds, said leverage effects being effective to move said control actuating member, tension means to oppose said centrifugally effective members, and means to render the lever portions effecting a greater leverage ineffective when predetermined speeds of said driving members have been attained.

8. In a speed responsive mechanism to effect predetermined movements of a control, a control actuating member, a driving member, a governor carried by said driving member, said governor comprising a plurality of sets of centrifugally operated members to actuate said control actuating member means to render one of said sets inoperative at the end of each predetermined movement, the remaining operative members being operable with a lesser leverage effect at higher speeds in each subsequent movement of said control actuating member, and tension means to oppose said centrifugally operated members.

9. In a speed responsive mechanism to effect predetermined movements of a control, a control actuating member, a driving member, a governor carried by said driving member, said governor comprising a plurality of sets of centrifugally operated members to actuate said control actuating member, means to render one of said sets inoperative at the end of each predetermined movement, the remaining operative members being operable with a lesser leverage effect at higher speeds in each subsequent movement of said control actuating member, tension means to oppose said centrifugally operated members, and an operator control to instantly vary the opposition of said tension means to the action of said governor.

10. In a speed responsive device to effect predetermined movements of a control, a driving member, a member to actuate said control, speed responsive means actuated by said driving member, said speed responsive means comprising the same number of governors as there are control movements, each of said governors including a plurality of weighted members including lever portions adapted to move said control actuating member, said control actuating member having a separate cam surface for each movement, all of said governors cooperating to effect the first of said movements, means to render one of said governors inoperative at the end of each of said movements, the lever portions of each governor having a cam portion for each movement of said control actuating member it effects and the cam portions of each governor cooperating in a movement being identical.

11. In a speed responsive device to effect predetermined movements of a control, a driving member, a member to actuate said control, speed responsive means actuated by said driving member, said speed responsive means comprising the same number of governors as there are control movements, each of said governors comprising a plurality of weighted members including lever portions adapted to move said control actuating member each of said lever portions being effective at a predetermined speed to accomplish a definite movement of said control actuating member, all of said governors cooperating to effect the first of said movements, means to render one of said governors inoperative at the end of one of said movements, the lever portions of the then operative governor members including portions longer than the lever portions of the inoperative governor members, and said longer lever portions being operative when said one governor becomes inoperative.

12. In a speed responsive device to effect predetermined movements of a control, a driving member, a member to actuate said control, speed responsive means actuated by said driving member, said speed responsive means comprising the same number of governors as there are control movements, each of said governors comprising a plurality of weighted members including lever portions adapted to move said control actuating member each of said lever portions being effective at a predetermined speed to accomplish a definite movement of said control actuating member, all of said governors cooperating to effect the first of said movements, means to render one of said governors inoperative at the end of one of said movements, the lever portions of the then operative governor members including portions longer than the lever portions of the inoperative governor members, said longer lever portions being operative when said one governor becomes inoperative, and said control actuating member having a separate cam surface for each of said movements.

13. In a speed responsive device to effect predetermined movements of a control, a driving member, a member to actuate said control, speed responsive means actuated by said driving member, said speed responsive means comprising the same number of governors as there are control movements, each of said governors comprising a plurality of weighted members including lever portions adapted to move said control actuating member each of said lever portions being effective at a predetermined speed to accomplish a definite movement of said control actuating member, all of said governors cooperating to effect the first of said movements, means to render one of said governors inoperative at the end of one of said movements, the lever portions of the then operative governor members including portions longer than the lever portions of the inoperative governor members, said longer lever portions being operative when said one governor becomes inoperative, said control actuating member having a separate cam surface for each of said movements, and said lever portions each including a separate cam portion for each movement it is to effect.

14. In a speed responsive mechanism to effect two predetermined movements of a control, a control actuating member, a driving member, and centrifugally operated members carried by said driving member, said centrifugally operated members including portions to contact said control actuating member at different predetermined speeds, said portions including a pair of spaced cam portions, one of said cam portions being effective at one of said predetermined speeds to give a greater leverage in effecting one of said predetermined movements and the other of said cam portions being effective at another of said predetermined speeds to give a lesser leverage in effecting the other of said predetermined movements.

15. The mechanism of claim 14, in which the control actuating member includes cam portions for coactive engagement by said cam portions of said centrifugally operated members.

JESSE W. HALE.